United States Patent
Kawada et al.

(10) Patent No.: US 9,118,059 B2
(45) Date of Patent: Aug. 25, 2015

(54) BATTERY ATTACHABLE/DETACHABLE ELECTRONIC EQUIPMENT

(75) Inventors: Yoshihiro Kawada, Osaka (JP); Masaru Furujiku, Osaka (JP)

(73) Assignee: Panasonic Intellectual Property Management, Co., Ltd., Osaka (JP)

( * ) Notice: Subject to any disclaimer, the term of this patent is extended or adjusted under 35 U.S.C. 154(b) by 452 days.

(21) Appl. No.: 13/016,049

(22) Filed: Jan. 28, 2011

(65) Prior Publication Data

US 2011/0211325 A1  Sep. 1, 2011

(30) Foreign Application Priority Data

Feb. 26, 2010  (JP) .................................. 2010-042658
Mar. 17, 2010  (JP) .................................. 2010-061281

(51) Int. Cl.
*H02J 7/00* (2006.01)
*H01M 2/10* (2006.01)

(52) U.S. Cl.
CPC .................................. *H01M 2/1066* (2013.01)

(58) Field of Classification Search
USPC .................................. 320/138; 361/807, 683
See application file for complete search history.

(56) References Cited

U.S. PATENT DOCUMENTS

| | | | | |
|---|---|---|---|---|
| 5,606,594 A | * | 2/1997 | Register et al. | 455/556.2 |
| 5,677,827 A | * | 10/1997 | Yoshioka et al. | 361/679.58 |
| 5,740,012 A | * | 4/1998 | Choi | 361/679.39 |
| 5,955,797 A | * | 9/1999 | Kim | 307/150 |
| 6,510,051 B2 | * | 1/2003 | Kim | 361/679.43 |
| 2002/0030970 A1 | | 3/2002 | Kim | |
| 2004/0067413 A1 | | 4/2004 | Sawachi | |
| 2004/0242042 A1 | * | 12/2004 | Buck et al. | 439/160 |
| 2009/0085523 A1 | * | 4/2009 | Kim | 320/138 |

FOREIGN PATENT DOCUMENTS

| | | |
|---|---|---|
| JP | H 3-164818 | 7/1991 |
| JP | H04-137354 | 5/1992 |
| JP | H 11-355976 | 12/1999 |
| JP | 2003-122449 | 4/2003 |
| JP | 2004-119174 | 4/2004 |

\* cited by examiner

*Primary Examiner* — Drew A Dunn
*Assistant Examiner* — Steve T Chung
(74) *Attorney, Agent, or Firm* — Hamre, Schumann, Mueller & Larson, P.C.

(57) ABSTRACT

The electronic equipment disclosed in the present application realizes a battery attachment/detachment mechanism with the reduced number of components, by biasing a slide lever 11 to a protrusion position by a biasing force of a switch lever 13a of a switch 13. More specifically, in the electronic equipment disclosed in the present application, it is unnecessary to provide biasing means for biasing the slide lever 11 to the protrusion position in addition to the switch 13, the number of components is reduced as compared with the configuration provided with biasing means in addition to the switch. By reducing the number of components, the cost is reduced and the assembly time in assembling notebook computers is reduced, thereby improving workability in the assembly.

12 Claims, 13 Drawing Sheets

BATTERY ATTACHABLE/DETACHABLE ELECTRONIC EQUIPMENT

BACKGROUND

1. Field

The present application relates to electronic equipment to/from which a battery is attachable/detachable.

2. Description of Related Art

Recently, portable electronic equipment such as a notebook computer often has a configuration to/from which a battery is attachable/detachable.

JP 2003-122449 A discloses a battery cover of portable electronic equipment into which a battery card is mounted, wherein a connector protrudes on a reverse side of the cover, a moveable switch for detecting attachment of the cover is provided on an end portion of the equipment body, and a stopper for restricting a movement of the switch is provided via a spring. Further, JP 2003-122449 A discloses a configuration in which when the cover is not attached, the stopper blocks the movement of the switch in an ON direction; and when the cover is attached, the movement of the switch in the ON direction is allowed by moving the stopper by the connector.

JP 2004-119174 A discloses a configuration in which, on an inner face of a battery cartridge, fulcrums that are capable of contacting with a peripheral face of a first battery are installed, and in insertion and pulling out of the battery cartridge, by consecutively applying pressure to a position from a site distant from a fulcrum of the peripheral face of the first battery over the fulcrums, and from the fulcrums over the distant site, the first battery is made to rock around the fulcrums and an elastic body which scrubs one pole (+) of the first battery with the other pole (−) of the second battery is installed on an inner face of a battery cartridge housing part.

However, in the configuration disclosed by JP 2003-122449 A, the spring is required for biasing the stopper. Therefore, the number of components is increased, which increases the cost and the assembly time.

Further, in the configuration disclosed by JP 2004-119174 A, the elastic bodies for avoiding the dropping of the battery cartridge should be provided for each battery cartridge. Therefore, the number of components is increased, which increases the cost and the assembly time.

SUMMARY

The electronic equipment disclosed in the present application includes a housing that has an opening to which a battery unit is insertable; an operation portion that allows operations of attaching/detaching the battery unit; a battery holding portion that holds the battery unit; a battery attachment portion that is provided with the operation portion and the battery holding portion, wherein the battery holding portion is disposed between the operation portion and the opening in the battery attachment portion.

DETAILED DESCRIPTION OF THE EMBODIMENTS

Embodiment 1

1. Configuration of Electronic Equipment

Figure 1:
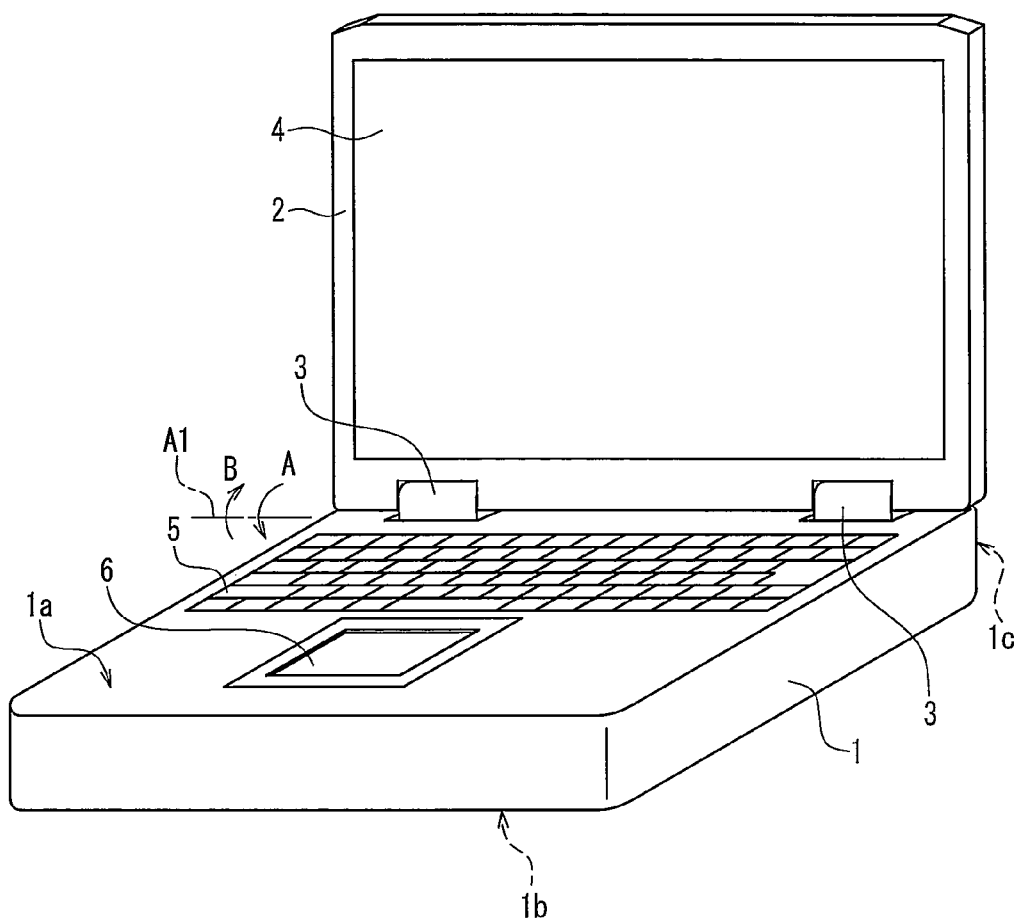
FIG. 1 is a perspective view of a notebook computer according to Embodiment 1.

FIG. 1 is a perspective view showing an appearance of a notebook computer as an example of electronic equipment according to the present embodiment. Note here that, although in the present embodiment the notebook computer is given as an example of the electronic equipment, the equipment is not limited hereto as long as it is at least one to/from which a battery is attachable/detachable.

As shown in FIG. 1A, the notebook computer includes a first housing 1 and a second housing 2. The first housing 1 contains a circuit board on which various electric elements are mounted, a hard disk drive, and the like. The second housing 2 includes a display device 4 (e.g., liquid crystal display). The first housing 1 and the second housing 2 are supported rotatably by hinge portions 3 in a direction indicated by an arrow A or B. Each hinge portion 3 has a shaft for supporting the first housing 1 and the second housing 2 rotatably. A keyboard 5 and a pointing device 6 are arranged on an upper face 1a of the first housing 1.

Figure 2:
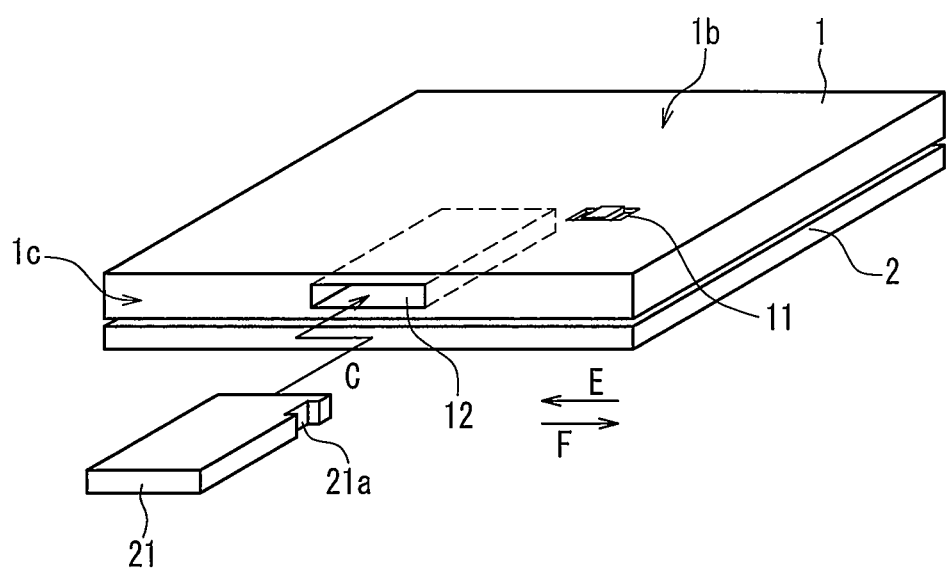
FIG. 2 is a perspective view of a lower face side of the notebook computer.

FIG. 2 is a perspective view showing a lower face 1b side and a back face is side of the notebook computer. Note here that the lower face 1b is a face opposed to the upper face 1a of the first housing 1. The lower face 1b includes a slide lever 11, which is displaceable in a direction indicated by an arrow E or F. The slide lever 11 can fix a battery unit 21 attached to a slot 12. Among four faces that are adjacent to the upper face 1a and the lower face 1b in the first housing 1, the back face 1c is a face positioned closest to an opening/closing axis A1 of the hinge portion 3 (see FIG. 1). The back face 1c includes the slot 12, which is capable of accepting the battery unit 21. The battery unit 21 has a concave portion 21a on one side face.

2. Configuration of the Battery Attachment/Detachment Mechanism

Figure 3A:
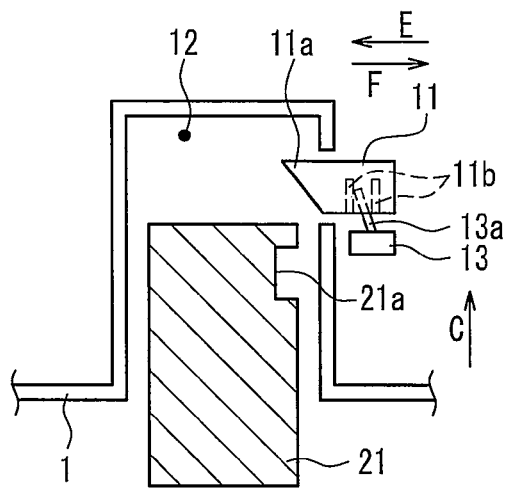
FIG. 3A is a schematic diagram showing a battery attachment/detachment configuration.
Figure 3B:
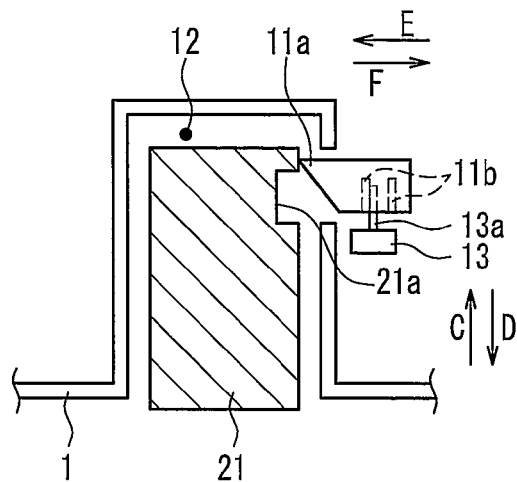
FIG. 3B is a schematic diagram showing the battery attachment/detachment configuration.
Figure 3C:
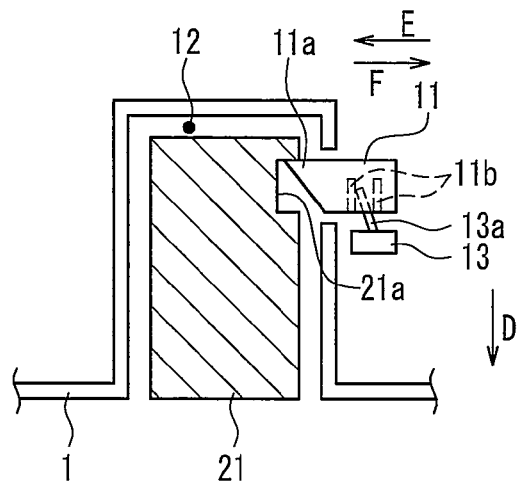
FIG. 3C is a schematic diagram showing the battery attachment/detachment configuration.

FIGS. 3A to 3C are schematic diagrams showing the attachment/detachment operations of the battery unit 21 to the slot 12. FIGS. 3A to 3C schematically show an internal structure around the slide lever 11 in FIG. 2.

The slide lever 11 includes a locking portion 11a with an inclined face, and two protrusions 11b on one main plane. In a space between the two protrusions 11b, it is possible to arrange at least a switch lever 13a (described later) of a switch 13. The switch lever 13 is arranged near the slide lever 11. The slide lever 11 is displaceable, as indicated by an arrow E or F, at least between a protrusion position where the locking portion 11a protrudes inside the slot 12 (FIGS. 3A and 3C) and a retraction position where the locking portion 11a retracts from the inside of the slot 12 (FIG. 3B).

The switch 13 includes the switch lever 13a that is turnable in the direction indicated by the arrow E or F. When the switch lever 13a is displaced in the direction indicated by the arrow E, the switch 13 is in an OFF state; and when the switch lever 13a is displaced in the direction indicated by the arrow F, the switch 13 is in an ON state. The switch lever 13a is biased constantly in the direction indicated by the arrow E by biasing means (not shown) housed in the switch 13. The switch lever 13a has a biasing force that at least allows the slide lever 11 to be pressed in the direction indicated by the arrow E and to be displaced to the protrusion position shown in FIGS. 3A and 3C. When the switch lever 13a is positioned in the direction indicated by the arrow E as shown in FIGS. 3A and 3C, the switch 13 is in the OFF state; and when the switch lever 13a is turned from the OFF state to a predetermined position in the direction indicated by the arrow F, the switch 13 is brought to the ON state. More specifically, the switch 13 is in the OFF state when the slide lever 11 is not operated by a user; and the switch 13 is shifted to the ON state only when the slide lever 11 is displaced in the direction indicated by the arrow E by the user.

Note here that FIG. 3B shows the state in which the switch lever 13a is turned from the state shown in FIG. 3A or 3C to the direction indicated by the arrow F, but the state shown in FIG. 3B is not the ON state. When the switch lever 13a is turned further from the position shown in FIG. 3B to the direction indicated by the arrow F, the switch 13 is brought to the ON state. The shift to the ON state can be performed by displacing the slide lever 11 to a predetermined position in the direction indicated by the arrow F. The switch 13 is connected electrically to a microcomputer (not shown) that is mounted on a printed board (not shown) arranged in the first housing 1. Based on the ON/OFF state of the switch 13, the microcomputer can perform various controls in the notebook computer.

In the case of attaching the battery unit 21 to the slot 12, first, as shown in FIG. 3A, the battery unit 21 is inserted into the slot 12 in the direction indicated by the arrow C until one end of the battery unit 21 comes into contact with the inclined face of the locking portion 11a of the slide lever 11 protruding inside the slot 12.

By further displacing the battery unit 21 having contacted with the inclined face of the locking portion 11a to the direction indicated by the arrow C, the slide lever 11 goes against the biasing force of the switch lever 13a toward the direction indicated by the arrow E and is displaced in the direction indicated by the arrow F as shown in FIG. 3B. The displacement of the slide lever 11 in the direction indicated by the arrow F allows the protrusions 11b to press the switch lever 13a in the direction indicated by the arrow F.

By displacing the battery unit 21 to the position shown in FIG. 3C, the slide lever 11 is displaced in the direction indicated by the arrow E due to the biasing force of the switch lever 13a toward the direction indicated by the arrow E, whereby the locking portion 11a engages with the concave portion 21a of the battery unit 21. After the engagement, the switch lever 13a is in a state of contacting with the protrusion 11b and being pressed continuously in the direction indicated by the arrow E, whereby the slide lever 11 maintains the protrusion position shown in FIG. 3C. Thus, the displacement of the battery unit 21 in the direction indicated by the arrow D (detachment direction) is regulated.

In the state shown in FIG. 3C, when removing the battery unit 21, the slide lever 11 is displaced in the direction indicated by the arrow F. By displacing the slide lever 11, the locking portion 11a is detached from the concave portion 21a. By pulling out the battery unit 21 from this state in the direction indicated by the arrow D, the battery unit 21 can be detached from the slot 12 as shown in FIG. 3A via the state shown in FIG. 3B. In the state shown in FIG. 3A, the slide lever 11 is displaced by the switch lever 13a in the direction indicated by the arrow E.

In the state shown in FIG. 3C, by displacing the slide lever 11 in the direction indicated by the arrow F, the switch lever 13a is turned from the position shown in FIG. 3C to the direction indicated by the arrow F. By the turning of the switch lever 13a to the predetermined position, the switch 13 is changed from the OFF state to the ON state. When the switch 13 is changed to the ON state, an electric potential of a predetermined terminal of the microcomputer (described later) to which the switch 13 is connected electrically varies. The microcomputer detects the changeover of the switch 13 from the OFF state to the ON state by detecting the variation in the electric potential of the predetermined terminal. When detecting the changeover of the switch 13 to the ON state, the microcomputer commences an arbitrary control in the notebook computer. The "arbitrary control" is, for example, a control of displaying an alarm message on the display device 4 in the case where the battery unit 21 is about to be detached from the slot 12.

3. Modification Example of the Battery Attachment/Detachment Mechanism

Figure 4:
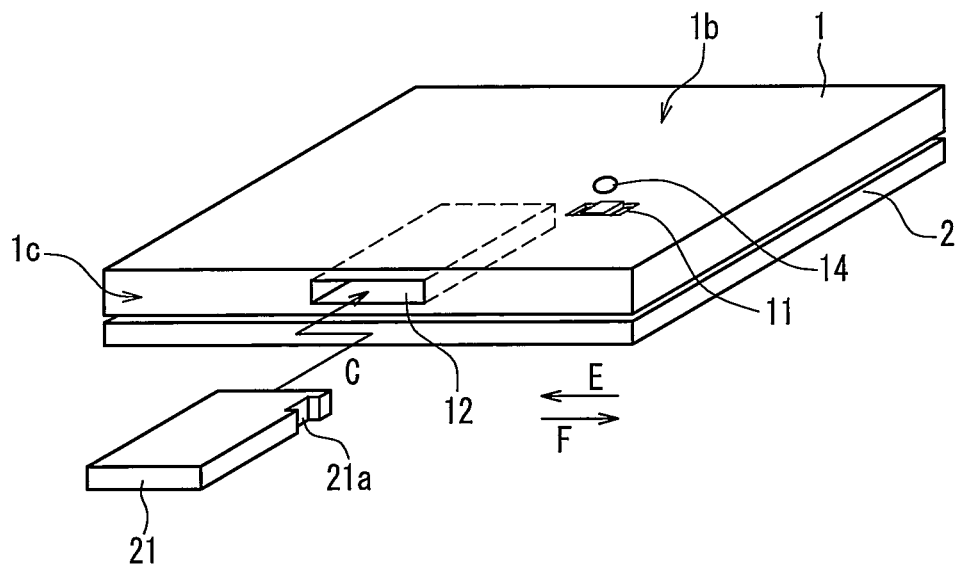
FIG. 4 is a perspective view of the lower face side of the notebook computer (modification example).

FIG. 4 is a perspective view showing a modification example of the battery attachment/detachment mechanism. In FIG. 4, the same reference numerals are assigned to the same components as those in FIG. 2, and the detailed descriptions thereof are omitted. The configuration of FIG. 4 is different from the configuration of FIG. 2 in that a light-emitting diode 14 (hereinafter, referred to as "LED") is provided on the lower face 1b of the first housing 1. The LED 14 lights up or blinks in conjunction with the ON state of the switch 13 (see FIG. 3A, etc.). The LED 14 preferably is disposed near the slide lever 11. In the present embodiment, the LED 14 includes a first light-emitting element emitting green light and a second light-emitting element emitting red light. These light-emitting elements can light up or blink simultaneously or separately by the control from a microcomputer 15 (described later). The detailed operation of the LED 14 and functions using the LED 14 will be described later.

Figure 5:
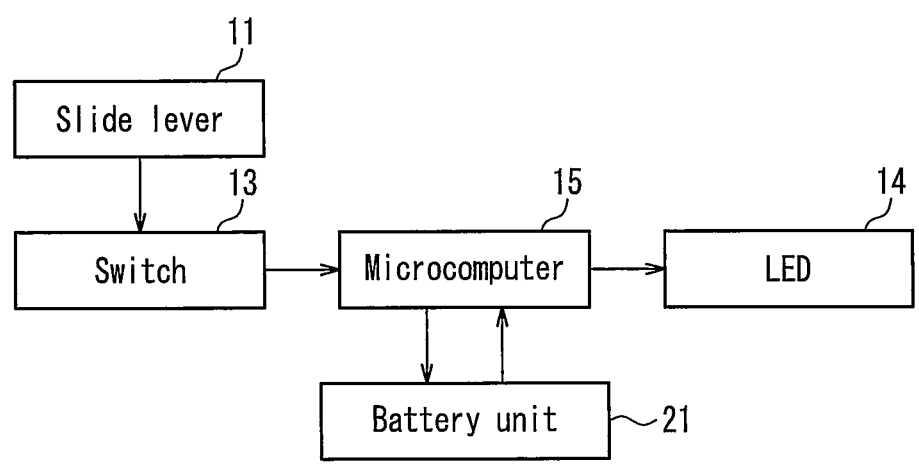
FIG. 5 is a block diagram of the notebook computer (modification example).

FIG. 5 is a block diagram showing the control of the LED 14. As shown in FIG. 5, the LED 14 is connected to the microcomputer 15, so that the operation of the LED 14 is controlled by the microcomputer 15. Hereinafter, the operation control of the LED will be described with reference to FIG. 5.

First, in a state where the battery unit 21 is attached to the slot 12 (see FIG. 3C), when the user displaces the slide lever 11 in the direction indicated by the arrow F, the switch 13 is shifted from the OFF state to the ON state. After the switch 13 is shifted to the ON state, an electric potential of the terminal of the microcomputer 15 that is connected to the switch 13 varies. The microcomputer 15 detects the shift of the switch 13 to the ON state based on the variation in the electric potential of the terminal.

After detecting the shift of the switch 13 to the ON state, the microcomputer 15 detects a remaining capacity of the battery unit 21. The remaining capacity of the battery unit 21 can be detected based on, for example, a terminal voltage of the battery unit 21. The microcomputer 15 makes a comparison between the detected remaining capacity of the battery unit 21 and a threshold, and when the remaining capacity is higher the threshold, it supplies a current to the first light-emitting element in the LED 14 for causing the LED 14 to emit green light. Meanwhile, when the remaining capacity of the battery unit 21 is lower than the threshold, the microcomputer 15 supplies a current to the second light-emitting element in the LED 14 for causing the LED 14 to emit red light. In other words, the LED 14 can emit different colors of light in accordance with the remaining capacity of the battery unit 21.

Thus, by adopting a configuration in which the remaining capacity of the battery unit 21 is displayed by causing the LED 14 to light up when the slide lever 11 is displaced and the switch 13 is shifted to the ON state, it is possible to check the remaining capacity of the battery unit 21 easily.

The remaining capacity of the battery in the notebook computer often is displayed on a liquid crystal display as an image by the control of the operating system. In the configuration in which the remaining capacity is displayed on the liquid crystal display, it is necessary that the power source of the notebook computer is in the ON state and the operating system is in an active state.

On the contrary, in the present embodiment, even in the case where the power source of the notebook computer is in the OFF state, the battery unit 21 supplies an electric power to the microcomputer 15 when the switch 13 is brought to the ON state, thereby activating the microcomputer 15. After that, the microcomputer 15 causes the LED 14 to light up for displaying the remaining capacity of the battery unit 21. Therefore, in the present embodiment, it is possible to display the remaining capacity of the battery unit 21 regardless of the ON/OFF state of the power source of the notebook computer and the activation state of the operating system. In other words, the user can check the remaining capacity of the battery unit easily even in the case where the power source of the notebook computer is in the OFF state or the operating system is not in the active state.

Note here that the configuration shown in FIG. 4 has one slot 12, but a plurality of slots for the battery attachment may be provided.

Figure 6:
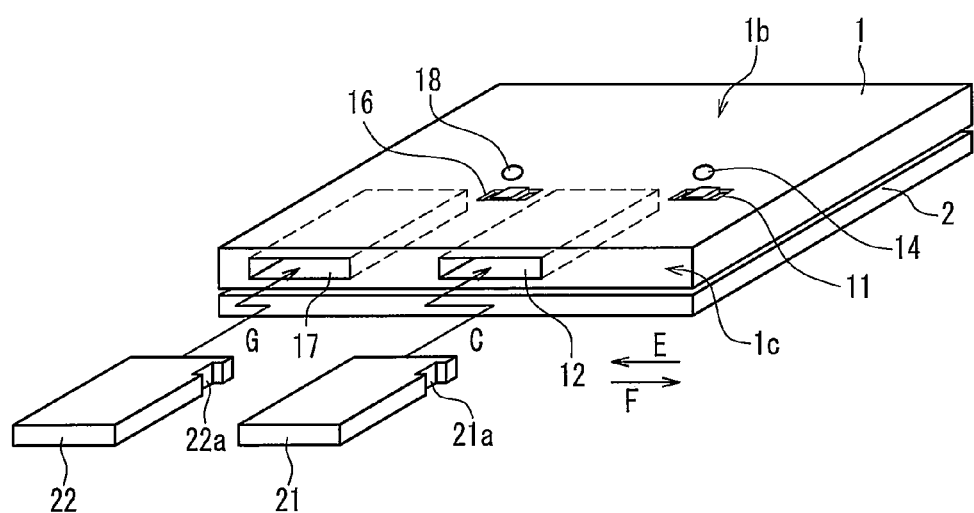
FIG. 6 is a perspective view of the lower face side of the notebook computer (modification example).

FIG. 6 is a perspective view of the notebook computer provided with two slots for the battery attachment. In FIG. 6, the same reference numerals are assigned to the same components as those in FIG. 4, and the detailed descriptions thereof are omitted. The notebook computer shown in FIG. 6 additionally includes a second slide lever 16, a second slot 17 and a second LED 18, as compared with the notebook computer shown in FIG. 4. Although the illustration is omitted, the notebook computer shown in FIG. 6 includes the configuration identical to the switch 13 shown in FIG. 4 near the second slide lever 16. A second battery unit 22 can be attached/detached to/from the second slot 17.

Note here that, although the slide lever 11, the slot 12 and the LED 14 shown in FIG. 6 are referred to as "first slide lever 11", "first slot 12" and "first LED 14", respectively, functions or the like in the respective constituent elements are the same as those shown in FIG. 4. Further, by adopting the same products as the first battery unit 21 and the second battery unit 22, the first battery unit 21 (second battery unit 22) can be attached to both the first slot 12 and the second slot 17.

In FIG. 6, electric power can be supplied to the notebook computer selectively from the first battery unit 21 attached to the first slot 12 or the second battery unit 22 attached to the second slot 17. For example, first, the notebook computer is operated based on the electric power supplied from the first battery unit 21, and when the remaining capacity of the first battery unit 21 is reduced, the battery unit is changed to the second battery unit 22 for the operation of the notebook computer.

In such a configuration, when the remaining capacity of either one of the first battery unit 21 and the second battery unit 22 is reduced and accordingly the battery unit should be detached from the slot for charging or the like, first, the notebook computer is placed so that the lower face 1*b* can be seen as shown in FIG. 6.

Next, the slide lever that is positioned on the side of the slot to which the battery unit to be detached is attached is displaced. By displacing the slide lever, the switch coupled to the slide lever is brought to the ON state, whereby the LED lights up.

At this time, even in the case where the battery unit to be detached is specified beforehand between the battery unit attached to the first slot 12 and the battery unit attached to the second slot 17, it is possible to specify the battery unit to be detached by displacing the first slide lever 11 or the second slide lever 16. More specifically, when the slide lever is displaced so as to cause the LED 14 to light up, the battery unit that is attached to the slot whose LED 14 emits red light is specified as the battery unit to be detached (the battery unit with low remaining capacity). Therefore, it is possible to prevent an operation error of mistakenly detaching the battery unit that should not to be detached.

4. Effects of Embodiment, etc.

According to the present embodiment, since the slide lever 11 is biased to the protrusion position by the biasing force of the switch lever 13*a* of the switch 13, it is possible to realize the battery attachment/detachment mechanism with the reduced number of components. More specifically, according to the present embodiment, since it is unnecessary to provide biasing means for biasing the slide lever 11 to the protrusion position in addition to the switch 13, the number of components is reduced as compared with the configuration provided with biasing means in addition to the switch. Further, by reducing the number of components, the cost is reduced and the assembly time in assembling notebook computers is reduced, thereby improving workability in the assembly.

Further, according to the present embodiment, as shown in FIG. 4, when the slide lever 11 is displaced for shifting the switch 13 to the ON state, the remaining capacity of the battery unit 21 is displayed by the LED 14. Thus, it is possible to check the remaining capacity easily even when the notebook computer or the operating system installed in the notebook computer is not activated.

Further, according to the present embodiment, as shown in FIG. 6, a plurality of the slots and LEDs corresponding to these slots are provided. Thus, it is possible to easily specify the battery unit that should be detached from the slot due to the low remaining capacity.

Note here that, although in the present embodiment the emission color of the LED is changed in accordance with the remaining capacity of the battery unit, the remaining capacity may be indicated by controlling the lighting/blinking of the LED. For example, when the remaining capacity of the battery unit is higher the threshold, the LED is caused to light up; and when the remaining capacity is lower than the threshold, the LED is caused to blink. Further, the remaining capacity may be indicated based on the number of the LED blinking. Further, the emission color of the LED is not limited to two colors as shown in the present embodiment, and may be one color or three or more colors. Furthermore, the emission color of the LED may be a mixed color obtained by causing display elements, each having a different emission color, to light up or blink at the same time.

Further, in the lower face 1b of the first housing 1, a film or the like may be adhered to a region where the LED 14 is arranged. More specifically, in the present embodiment, the LED 14 is arranged inside the first housing 1, and a through-hole is provided at a portion opposed to the LED 14 in the first housing 1, whereby light emitted by the LED 14 can be seen from the outside of the first housing 1 via the through-hole. As described above, when the through-hole is provided in the first housing 1, there is a possibility that a liquid, a foreign matter or the like enters the first housing 1 from the through-hole, which may cause troubles such as electrical short circuits of electric components provided inside the first housing 1. To cope with this, by adhering a film or the like in such a manner as to close the through-hole, the entrance of a liquid, a foreign matter or the like into the first housing 1 can be avoided. Further, by adopting a film that is transparent or semi-transparent at least at a region overlapped with the through-hole, it is possible to suppress any decrease in the visibility of light emitted from the LED 14.

Further, although in the present embodiment the LED 14 is fixed to the first housing 1, it may be fixed to the slide lever 11.

Further, although in the present embodiment the first battery unit 21 and the second battery unit 22 are attached/detached as shown in FIG. 6, a dummy unit may be attached/detached instead. The dummy unit is a unit having substantially the same outer shape as the battery unit and not having charge storage functions internally. The dummy unit is provided in the equipment that has a plurality of battery slots and that does not have covers or the like capable of closing the battery slots as shown in FIG. 6, so as to avoid the entrance of a foreign matter or the like into the slot where the battery unit is not attached. For example, in the equipment provided with two slots 12 and 17 as shown in FIG. 6, when the battery unit is attached only to the first slot 12, i.e., the second slot 17 is in an open state, a liquid or a foreign matter may enter the second slot 17. If a liquid, a foreign matter or the like enters the second slot 17, troubles such as an electric short circuit of a power supply terminal in the second slot 17 may occur. For avoiding such troubles, the attachment of the dummy battery is effective. In the present embodiment, when the slide lever 11 or 16 is displaced in a state where the dummy unit is attached to the first slot 12 or the second slot 17, the LED 14 or 18 emits red light. More specifically, since the dummy unit does not have charge storage functions, no current flows into the power supply terminal in the slot with the dummy unit. Thus, the microcomputer 15 determines the slot as "low remaining capacity" and causes the LED 14 or 18 to emit red light. Therefore, according to the present embodiment, even when the dummy unit is attached to the slot, the operation error of mistakenly detaching the battery unit can be prevented by checking the emission state of the LED.

Further, the slide levers 11 and 16 in the present embodiment are one example of the battery locking means. The slide levers 11 and 16 in the present embodiment are one example of the operation portion. The switch 13 in the present embodiment is one example of the switch. The switch lever 13a in the present embodiment is one example of the switch lever. The LEDs 14 and 18 in the present embodiment are one example of the light-emitting element. The microcomputer 15 in the present embodiment is one example of the remaining capacity detection means or one example of the configuration having the function of the remaining capacity detection means.

The following notes are disclosed regarding the present embodiment.

(Note 1)

Electronic equipment in which a battery unit is attachable/detachable to/from a housing, comprising:

an operation portion arranged displaceably on one principal face of the housing and capable of locking the battery unit; and a switch provided with a switch lever biased in one direction, wherein the switch lever biases the operation portion in one direction.

(Note 2)

The electronic equipment according to Note 1, further comprising:

a light-emitting element that emits light when the switch is shifted to an ON state; and remaining capacity detection means that detects a remaining capacity of the battery unit, wherein, when detecting the shift of the switch to the ON state, the remaining capacity detection means causes the light-emitting element to emit light in accordance with the remaining capacity of the battery unit.

(Note 3)

The electronic equipment according to Note 1 or 2, to/from which a plurality of battery units are attachable/detachable.

Embodiment 2

1. Configuration of Electronic Equipment

Figure 7:
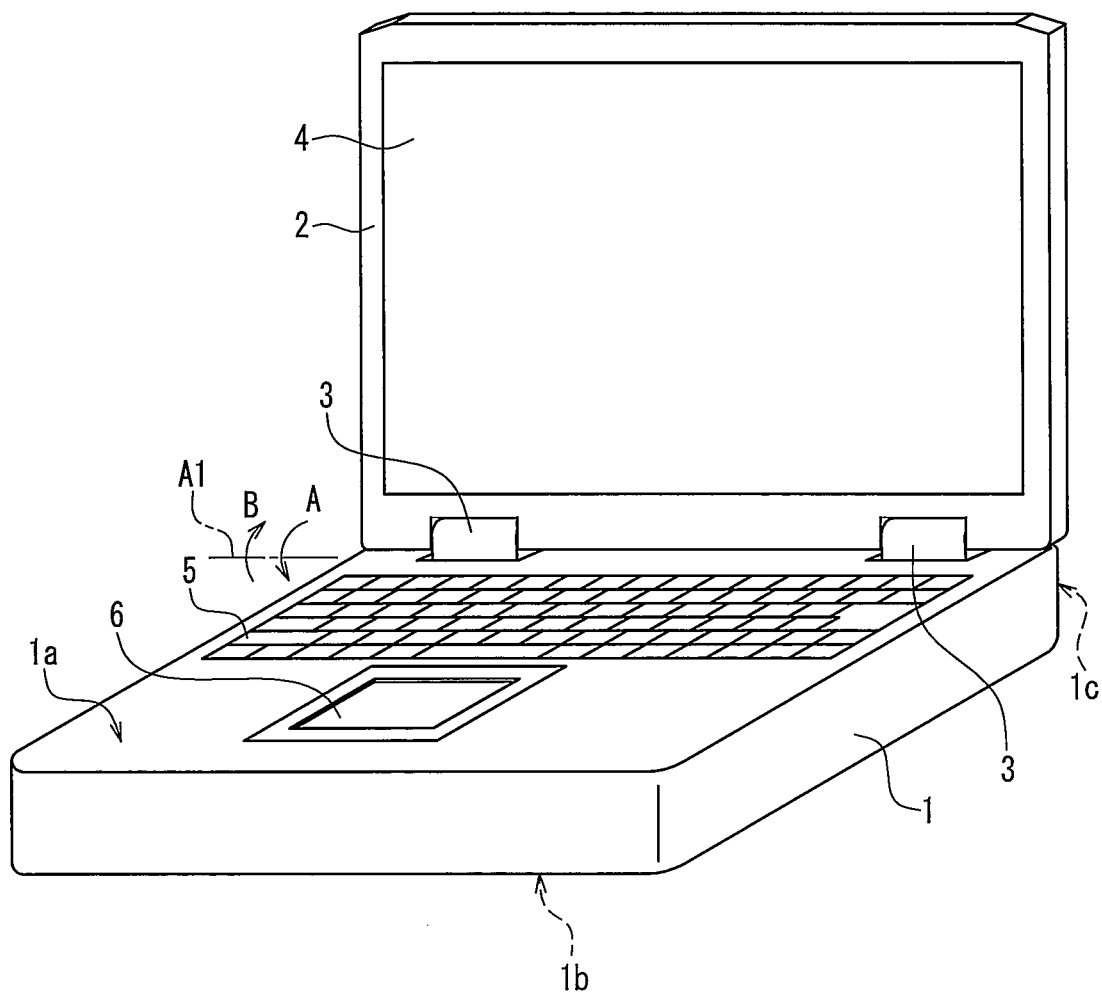
FIG. 7 is a perspective view of a notebook computer according to Embodiment 2.

FIG. 7 is a perspective view showing an appearance of a notebook computer as an example of electronic equipment according to the present embodiment. Note here that, although in the present embodiment the notebook computer is given as an example of the electronic equipment, the equipment is not limited hereto as long as it is at least one to/from which a battery is attachable/detachable.

As shown in FIG. 7, the notebook computer includes a first housing 1 and a second housing 2. The first housing 1 contains a circuit board on which various electric elements are mounted, a hard disk drive, and the like. The second housing 2 includes a display device 4 (e.g., liquid crystal display). The first housing 1 and the second housing 2 are supported rotatably by hinge portions 3 in a direction indicated by an arrow A or B. Each hinge portion 3 has a shaft for supporting the first housing 1 and the second housing 2 rotatably. A keyboard 5 and a pointing device 6 are arranged on an upper face 1a of the first housing 1.

Figure 8:
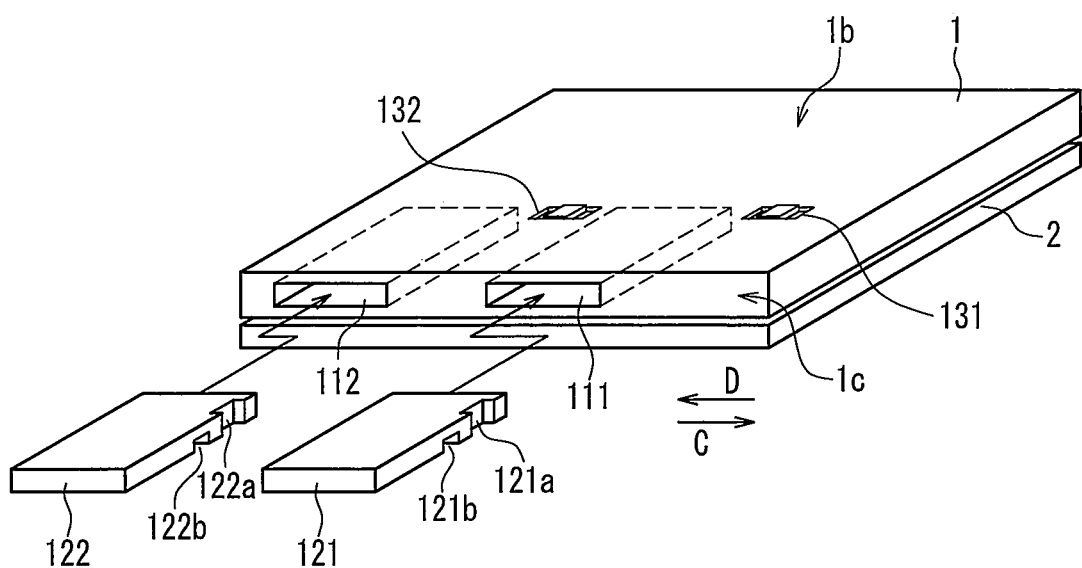
FIG. 8 is a perspective view of a lower face side of the notebook computer.
Figure 9:
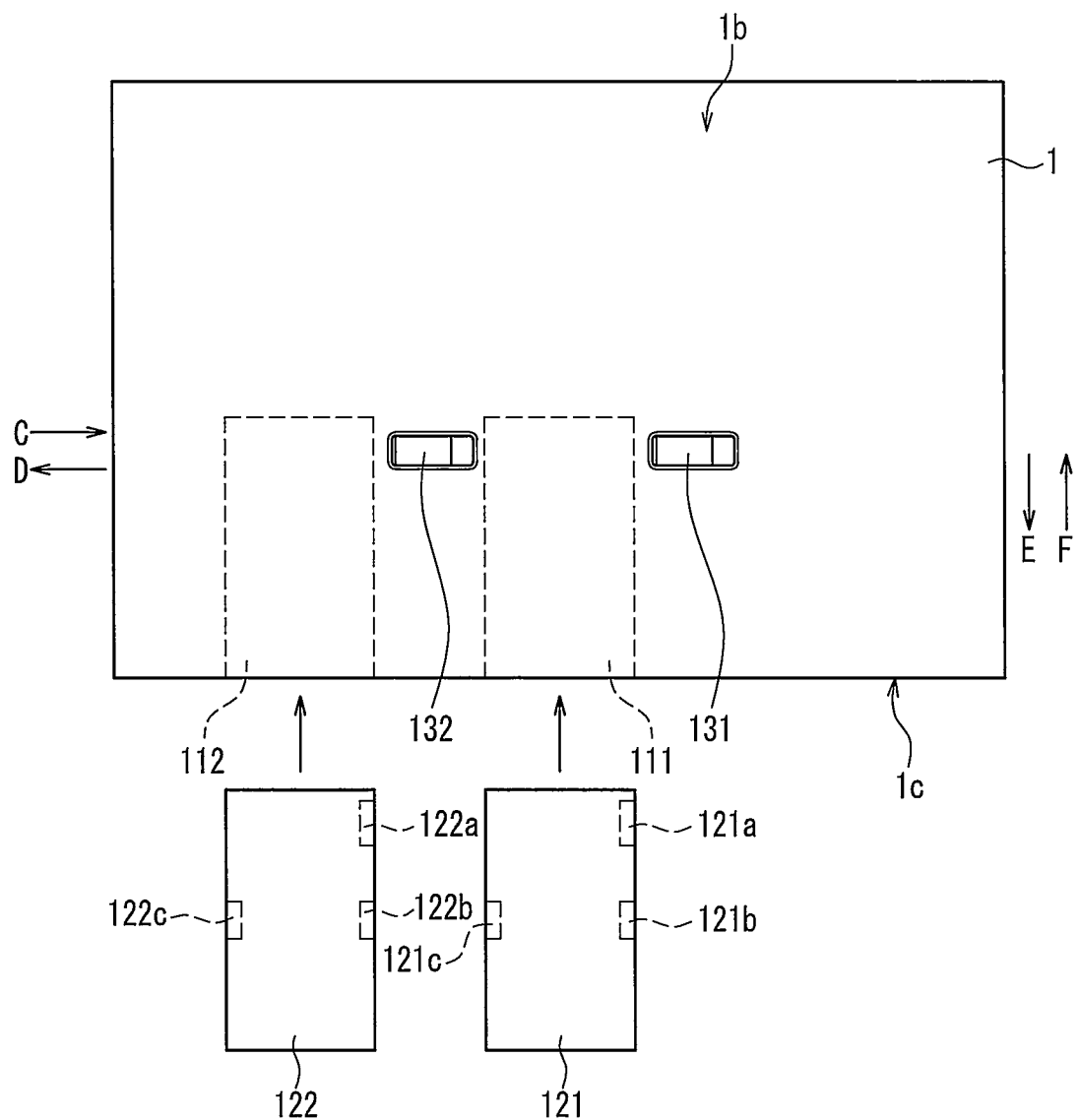
FIG. 9 is a plan view of a lower face of the notebook computer.

FIG. 8 is a perspective view showing a lower face 1b side and a back face is side of the notebook computer. FIG. 9 is a plan view of the lower face 1b of the notebook computer.

The lower face 1b is a face opposed to the upper face 1a of the first housing 1, and includes slide levers 131 and 132. Among four faces that are adjacent to the upper face 1a and the lower face 1b in the first housing 1, the back face 1c is a face positioned closest to an opening/closing axis A1 of the hinge portion 3 (see FIG. 7). The back face 1c includes slots 111 and 112.

The slot 111 is capable of accepting the battery unit 121. The slot 112 is capable of accepting the battery unit 122. Note here that, since the battery unit 121 and the battery unit 122 have the same shape, the battery unit 122 can be inserted into the slot 111 and the battery unit 121 can be inserted into the slot 112.

As shown in FIG. 9, the battery unit 121 has concave portions 121a and 121b on one side face, and has a concave portion 121c on the other side face (opposed face of the one side face). As shown in FIG. 9, the battery unit 122 has concave portions 122a and 122b on one side face, and has a concave portion 122c on the other side face (opposed face of the one side face).

The slide levers 131 and 132 are displaceable in a direction indicated by an arrow C or D. The slide lever 131 can lock, for example, the battery unit 121 attached to the slot 111 and is biased to a locking position (in the direction indicated by the arrow D) by biasing means such as a spring (not shown). The slide lever 132 can lock, for example, the battery unit 122 attached to the slot 112 and is biased to a locking position (in the direction indicated by the arrow D) by biasing means such as a spring (not shown).

2. Configuration of the Battery Holding Device

Figure 10:
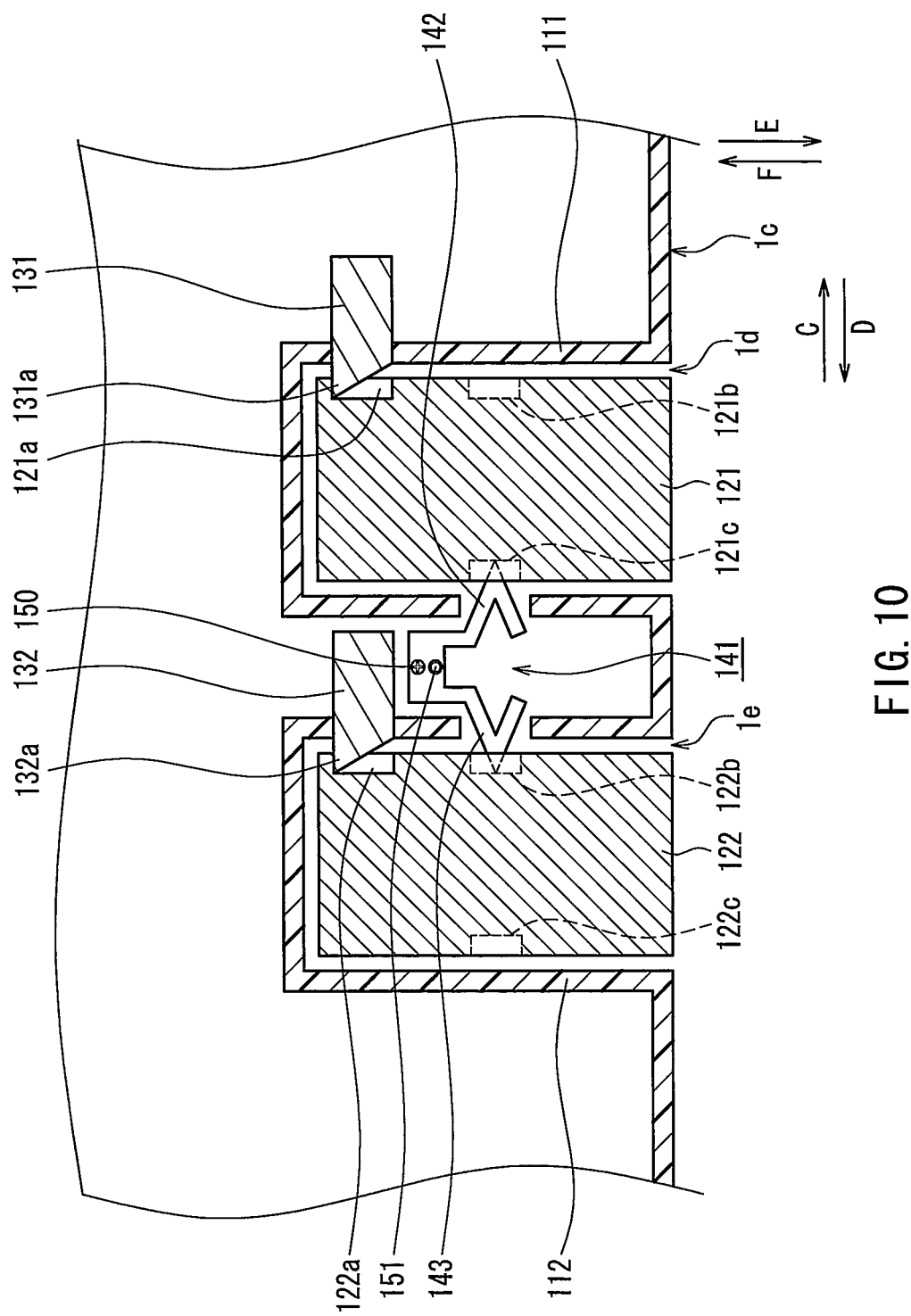
FIG. 10 is a schematic diagram showing the vicinity of slots.

FIG. 10 is a schematic diagram showing the configuration of the slots 111, 112 and the vicinity of these slots in first housing 1.

As shown in FIG. 10, the slide lever 131 includes a locking portion 131a with an inclined face. The slide lever 132 includes a locking portion 132a with an inclined face. The slide levers 131 and 132 are displaceable in the direction indicated by the arrow C or D and biased in the direction indicated by the arrow D by biasing means such as a spring.

Figure 11:
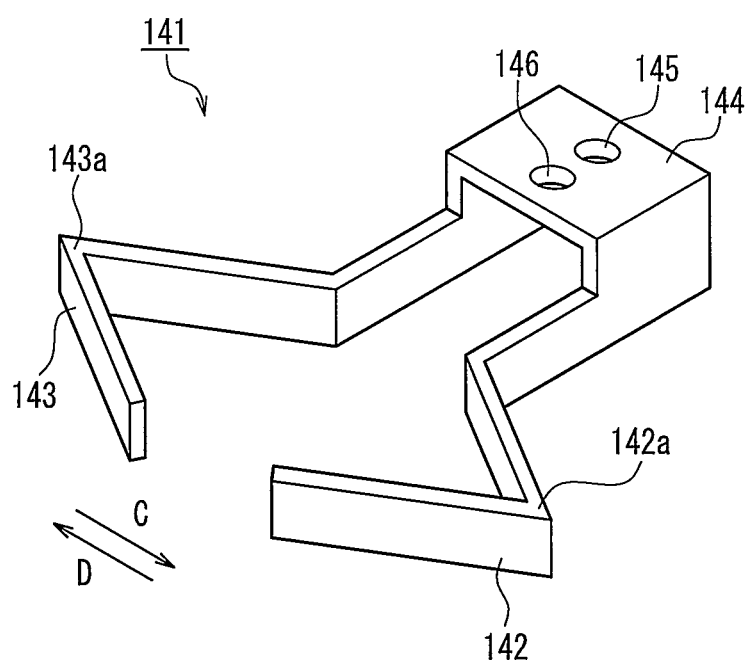
FIG. 11 is a perspective view of a holding member.

A holding member 141 is disposed between the slots 111 and 112. FIG. 11 is a perspective view of the holding member 141. The holding member 141 includes a first holding portion 142, a second holding, portion 143, a fixing portion 144, a first hole 145 and a second hole 146. The holding member 141 is formed of a plate made of stainless steel or the like, and at least the first holding portion 142 and the second holding portion 143 have elasticity.

The first holding portion 142 can be deformed elastically in the direction indicated by the arrow C or D. The first holding portion 142 has a bent portion 142a that is bent substantially in a "V" shape. The bent portion 142a can be fitted in the concave portion 121b or 121c of the battery unit 121 and the concave portion 122b or 122c of the battery unit 122. The bent portion 142a and the bent portion 143a are bent in the opposing direction. The first holding portion 142 is disposed between the slide lever 131 and an opening 1d in insertion/detachment directions of the battery unit 121 (directions indicated by the arrows E and F).

The second holding portion 143 can be deformed elastically in the direction indicated by the arrow C or D. The second holding portion 143 has a bent portion 143a that is bent substantially in a "V" shape. The bent portion 143a can be fitted in the concave portion 121b or 121c of the battery unit 121 and the concave portion 122b or 122c of the battery unit 122. The second holding portion 143 is disposed between the slide lever 132 and an opening 1e in the insertion/detachment directions of the battery unit 122 (directions indicated by the arrows E and F).

The fixing portion 144 is a portion coupling the first holding portion 142 and the second holding portion 143, and is provided with the first hole 145 and the second hole 146. At the time of fixing the holding member 141 to the first housing 1, a screw 150 (see FIG. 10) can be inserted into the first hole 145 and a pin 151 (see FIG. 10) formed on the first housing 1 can be inserted into the second hole 146.

As shown in FIG. 10, the holding member 141 is fixed between the slots 111 and 112. By inserting the screw 150 into the first hole 145 (see FIG. 11) and mounting it in a screw hole formed in the first housing 1, the holding member 141 is fixed to the first housing 1.

Further, since the pin 151 formed on the first housing 1 is inserted into the second hole 146 of the holding member 141, it is possible to fix the holding member 141 to the first housing 1 with a predetermined posture. In other words, in a configuration in which the holding member 141 is fixed only by the screw 150, the holding member 141 may rotate about the screw 150 when a pressure is applied to the holding member 141 in the direction indicated by the arrow C or D. By inserting the pin 15 into the second hole 146 as in the present embodiment, it is possible to avoid the rotation of the holding member 141.

Further, the holding member 141 is arranged so that at least the bent portion 142a of the first holding portion 142 protrudes inside the slot 111 and at least the bent portion 143a of the second holding portion 143 protrudes inside the slot 112. The protruding amount of the first holding portion 142 is an amount that at least allows the bent portion 142a to be fitted in the concave portion 121c of the battery unit 121 inserted in the slot 111 or fitted in the concave portion 122c of the battery unit 122. The protruding amount of the second holding portion 143 is an amount that at least allows the bent portion 143a to be fitted in the concave portion 121b of the battery unit 121 inserted in the slot 112 or fitted in the concave portion 122b of the battery unit 122.

Thereinafter, the attachment operation of the battery units 121 and 122 will be described.

When the battery unit 121 is inserted into the slot 111 in the direction indicated by the arrow F, first, an end of the battery unit 121 comes into contact with the first holding portion 142 of the holding member 141.

Next, when the battery unit 121 is displaced in the direction indicated by the arrow F, the first holding portion 142 is pressed by the battery unit 121 and deformed elastically in the direction indicated by the arrow D, whereby the bent portion 142a runs upon a side face of the battery unit 121.

When the battery unit 121 is displaced further in the direction indicated by the arrow F, the end of the battery unit 121 comes into contact with the inclined face of the locking portion 131a of the slide lever 131.

When the battery unit 121 is displaced further in the direction indicated by the arrow F, the slide lever 131 is pressed by the battery unit 121 and is displaced in the direction indicated by the arrow C.

By displacing the battery unit 121 to an end portion of the slot 111 in the direction indicated by the arrow F, the slide lever 131 is displaced in the direction indicated by the arrow D by the biasing force of the biasing means (not shown), whereby the locking portion 131a engages with the concave portion 121a of the battery unit 121.

After the engagement, the slide lever 131 is brought to a state of being pressed continuously in the direction indicated by the arrow D by the biasing means, thereby maintaining the protrusion position shown in FIG. 10.

In this way, the displacement of the battery unit 121 in the direction indicated by the arrow E (detachment direction) is regulated. Further, at this time, the first holding portion 142 of the holding member 141 is fitted in the concave portion 121c of the battery unit 121.

When the battery unit 122 is inserted into the slot 112 in the direction indicated by the arrow F, first, an end of the battery unit 122 comes into contact with the second holding portion 143 of the holding member 141.

Next, when the battery unit 122 is displaced in the direction indicated by the arrow F, the second holding portion 143 is pressed by the battery unit 122 and deformed elastically in the direction indicated by the arrow C, whereby the bent portion 143a runs upon a side face of the battery unit 122.

When the battery unit 122 is displaced further in the direction indicated by the arrow F, the end of the battery unit 122 comes into contact with the inclined face of the locking portion 132a of the slide lever 132.

When the battery unit 122 is displaced further in the direction indicated by the arrow F, the slide lever 132 is pressed by the battery unit 122 and is displaced in the direction indicated by the arrow C.

By displacing the battery unit 122 to an end portion of the slot 112 in the direction indicated by the arrow F, the slide lever 132 is displaced in the direction indicated by the arrow D by the biasing force of the biasing means (not shown), whereby the locking portion 132a engages with the concave portion 122a of the battery unit 122.

After the engagement, the slide lever 132 is brought to a state of being pressed continuously in the direction indicated by the arrow D by the biasing means, thereby maintaining the protrusion position shown in FIG. 10.

In this way, the displacement of the battery unit 122 in the direction indicated by the arrow E (detachment direction) is regulated. Further, at this time, the second holding portion 143 of the holding member 141 is fitted in the concave portion 122b of the battery unit 122.

In the case of removing the battery unit 121 from the slot 111, first, the slide lever 131 is displaced in the direction indicated by the arrow C for detaching the locking portion 131a from the concave portion 121a of the battery unit 121. Thus, the battery unit 121 is placed in the state capable of being displaced in the direction indicated by the arrow E. At this time, since the first holding portion 142 of the holding member 141 is fitted in the concave portion 121c of the battery unit 121, the battery unit 121 is less likely to be displaced in the direction indicated by the arrow E. For example, even in the case where the notebook computer is placed with the back face 1c of the first housing 1 facing vertically downward, the displacement of the battery unit 121 in a vertically downward direction is regulated by the holding member 141, whereby the battery unit 121 is less likely to come off from the slot 111 due to the self weight.

Next, by gripping the end portion of the battery unit 121 on the side exposed from the slot 111, the battery unit 121 is pulled out in the direction indicated by the arrow E. At this time, the first holding portion 142 fitted in the concave portion 121c is pressed by the side face of the battery unit 121 and deformed elastically in the direction indicated by the arrow D, thereby being detached from the concave portion 121c.

After being detached from the concave portion 121c, the first holding portion 142 runs upon the side face of the battery unit 121. Then, by displacing the battery unit 121 further in the direction indicated by the arrow E, it is possible to remove the battery unit 121 from the slot 111.

In the case of removing the battery unit 122 from the slot 112, first, the slide lever 132 is displaced in the direction indicated by the arrow C for detaching the locking portion 132a from the concave portion 122a of the battery unit 122. Thus, the battery unit 122 is placed in the state capable of being displaced in the direction indicated by the arrow E. At this time, since the second holding portion 143 of the holding member 141 is fitted in the concave portion 122b of the battery unit 122, the battery unit 122 is less likely to be displaced in the direction indicated by the arrow E. For example, even in the case where the notebook computer is placed with the back face 1c of the first housing 1 facing vertically downward, the displacement of the battery unit 122 in the vertically downward direction is regulated by the holding member 141, whereby the battery unit 122 is likely to come off from the slot 112 due to the self weight.

Next, by gripping the end portion of the battery unit 122 on the side exposed from the slot 112, the battery unit 122 is pulled out in the direction indicated by the arrow E. At this time, the second holding portion 143 fitted in the concave portion 122b is pressed by the side face of the battery unit 122 and deformed elastically in the direction indicated by the arrow C, thereby being detached from the concave portion 122b. After being detached from the concave portion 122b, the second holding portion 143 runs upon the side face of the battery unit 122. By continuously displacing the battery unit 122 in the direction indicated by the arrow E, it is possible to remove the battery unit 122 from the slot 112.

Note here that, since the battery unit 121 and the battery unit 122 have the same shape and the same dimension, the battery unit 121 can be attached to the slot 112. In that case, the slide lever 132 engages with the concave portion 121a of the battery unit 121 and the second holding portion 143 of the holding member 141 is fitted in the concave portion 121b.

Further, the battery unit 122 can be attached to the slot 111. In that case, the slide lever 131 engages with the concave portion 122a of the battery unit 122 and the first holding portion 142 of the holding member 141 is fitted in the concave portion 122c.

3. Effects of Embodiment, etc.

The holding member 141 of the present embodiment is arranged between the slots 111 and 112. The battery units have concave portions. The first holding portion 142 can be fitted in the concave portion of the battery unit inserted in the slot 111. The second holding portion 143 can be fitted in the concave portion of the battery unit inserted in the slot 112. With this configuration, even when the battery unit is unlocked by displacing the slide lever 131 or 132 in the direction indicated by the arrow C, the battery unit is less likely to be detached from the slot due to the self weight. Therefore, even in the case where the notebook computer is placed with the back face 1c of the first housing 1 facing vertically downward for example, it is possible to avoid the battery unit from being mistakenly dropped on a floor, etc.

Further, according to the present embodiment, since one holding member 141 can hold two battery units, a structure for avoiding the dropping of the battery unit can be realized with the reduced number of components, which results in the reduction in the component cost. Further, since the number of components is reduced, it is possible to reduce the man-hours in the assembly as well as the production cost.

Further, according to the present embodiment, since the holding member 141 can be formed by bending a metal plate, the production is easy.

Further, according to the present embodiment, since the holding member 141 is fixed to the first housing 1 by providing the first hole 145 and the second hole 146 in the holding member 141, inserting the pin 151 into the second hole 146, and inserting the screw 150 into the first hole 145, it is possible to position the holding member 141 reliably. Assuming that the holding member 141 is positioned only by the screw 150, and when the first holding portion 142 is deformed elastically in the direction indicated by the arrow D or the second holding portion 143 is deformed elastically in the direction indicated by the arrow C during the attachment/detachment of the battery unit, the holding member 141 may be displaced about the screw 150 in the rotation direction. In the present embodiment, since the holding member 141 is positioned at two locations, it is possible to prevent the holding member 141 from being displaced accidentally even when the first holding portion 142 is deformed elastically in the direction indicated by the arrow D or the second holding portion 143 is deformed elastically in the direction indicated by the arrow C.

Further, according to the present embodiment, since the holding member 141 is fixed to the first housing 1 by providing the first hole 145 and the second hole 146 in the holding member 141, inserting the pin 151 into the second hole 146, and inserting the screw 150 into the first hole 145, it is possible to improve the workability in fixing the holding member 141 to the first housing 1. More specifically, since the holding member 141 is configured to be fixed to the first housing 1 using the screw 150, the holding member 141 may rotate along with the rotation of a driver when the screw 150 is inserted into the first hole 145 and mounted in the screw hole (not shown) of the first housing 1. Therefore, positioning the holding member 141 in place becomes difficult. In the present embodiment, since the holding member 141 is provided with the second hole 146, and the pin 151 is inserted into the second hole 146 at the time of fixing the holding member 141 to the first housing 1, it is possible to prevent the holding member 141 from being rotated accidentally even when the screw 150 is mounted in the screw hole (not shown) of the first housing 1 by the driver.

Further, according to the present invention, since the first holding portion 142 is disposed between the slide lever 131 and the opening 1d in the insertion/detachment directions of the battery unit 121 (directions indicated by the arrows E and F), it is possible to avoid the battery unit 121 from being mistakenly dropped from the slot 111 even when the locking of the battery unit 121 by the slide lever 131 is released. In other words, even when the locking of the battery unit 121 by the slide lever 131 is released, the first holding portion 142 holds the battery unit 121, thereby avoiding the battery unit 121 from being mistakenly dropped from the slot 111. Further, since the first holding portion 142 is fitted in the concave portion 121c of the battery unit 121 with a margin, when the locking by the slide lever 131 is released, the battery unit 121 may be displaced partially to a position protruding from the opening 1d. The user can pull out the battery unit 121 from the slot 111 by gripping and displacing the portion of the battery unit 121 protruding from the opening 1d. The second holding portion 143 also can obtain the same effect described above.

Note here that, although in the represent embodiment, the holding member 141 is formed of a stainless steel plate, the material is not limited to metal as long as it can be deformed elastically. The holding member 141 can be formed of resin or the like.

Further, although in the present embodiment the screw 150 is used as means for fixing the holding member 141 to the first housing 1, other fixation means may be used. For example, a rivet may be used in place of the screw 150. Further, a pin may be provided in the first housing 1 so as to be press-fitted in the first hole 145.

Figure 12:
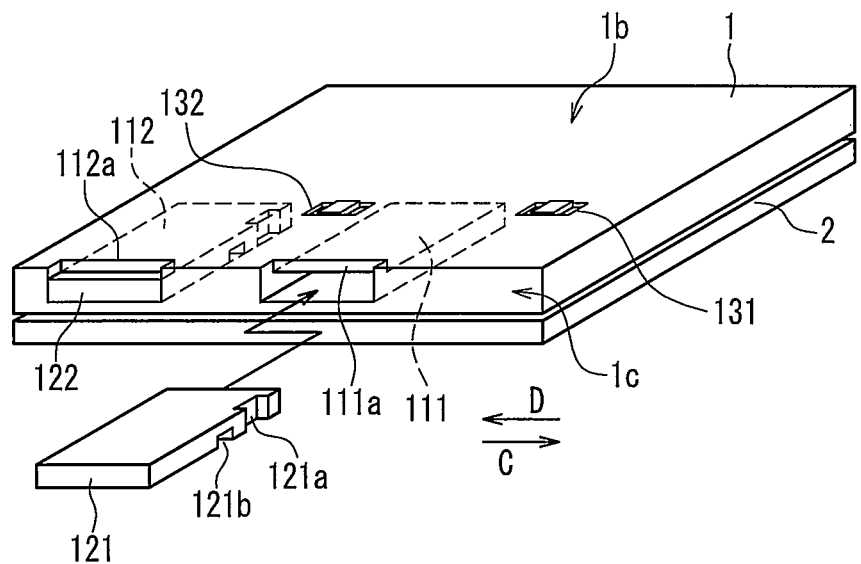
FIG. 12 is a perspective view showing a modification example of the notebook computer.

Further, as shown in FIG. 12, when the battery units 121 and 122 are received in the slots 111 and 112, respectively, they may be exposed partially from the first housing 1 as a margin for gripping. More specifically, although the slots 111 and 112 shown in FIG. 8 have openings only in the back face 1c of the first housing 1, the slots 111 and 112 shown in FIG. 12 are provided with openings in the back face 1c and formed with notches 111a and 112a in the lower face 1b.

Thus, in a state where the battery units 121 and 122 are received in the slots 111 and 112, respectively (FIG. 12 shows the state where the battery unit 122 is received in the slot 112), the battery units 121 and 122 are exposed partially in the lower face 1b and the back face 1c of the first housing 1. By gripping the exposed portion of the battery unit by fingers of the user, it is possible to reduce the possibility of mistakenly dropping the battery unit on a floor, etc., in the removal of the battery unit from the slot.

In the configuration shown in FIG. 12, the notches 111a and 112a are exposed when the battery units 121 and 122 are received in the slots 111 and 112, respectively. However, the battery units 121 and 122 may have shapes such that part of them can match the notches 111a and 112a, respectively.

Figure 13:
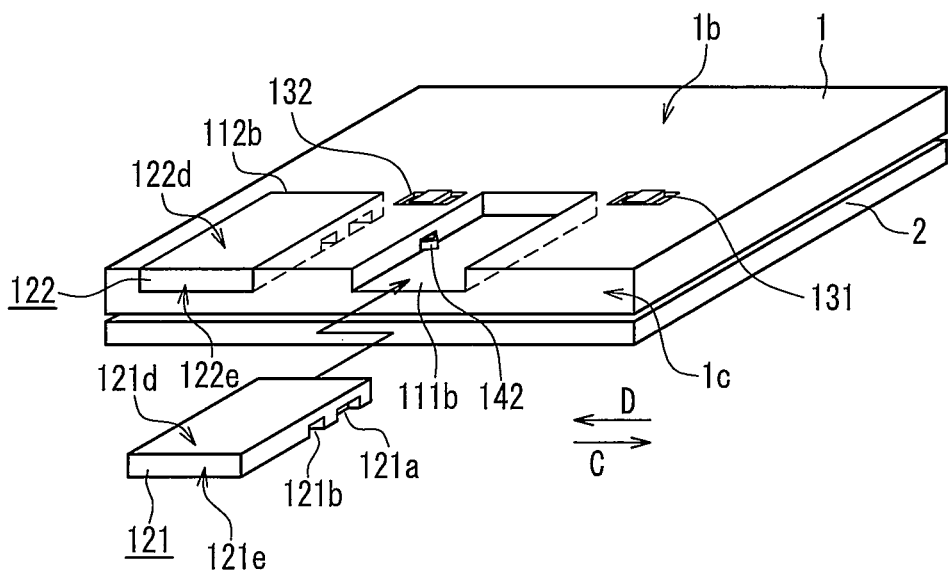
FIG. 13 is a perspective view showing another modification example of the notebook computer.

FIG. 13 shows a configuration in which the battery units 121 and 122 also serve as a part of the lower face 1b of the first housing 1 in the state where they are received in the slots 111 and 112, respectively.

Specifically, the slots 111b and 112b shown in FIG. 13 are open in the lower face 1b and the back face 1c of the first housing 1, and planar shapes of the slots 111b and 112b that are open in the lower face 1b are the same as planar shapes of the battery units 121 and 122.

Note here that FIG. 13 shows the state where the first holding portion 142 of the holding member 141 protrudes inside the slot 111b, but the second holding portion 143 also protrudes inside the slot 112b (not shown). The second holding portion 143 protruding inside the slot 112b is fitted in the concave portion 122b in the battery unit 122 (not shown). Further, side shapes of the slots 111b and 112b that are open in the back face 1c of the first housing 1 are the same as side shapes of the battery units 121 and 122. Thus, when the battery unit 121 is received in the slot 111b for example, the lower face 1b is flush with a lower face 121d of the battery unit 121, and the back face 1c is flush with a back face 121e of the battery unit 121. Further, when the battery unit 122 is received in the slot 112b for example, the lower face 1b is flush with a lower face 122d of the battery unit 122, and the back face 1c is flush with a back face 122e of the battery unit 122.

Figure 14:
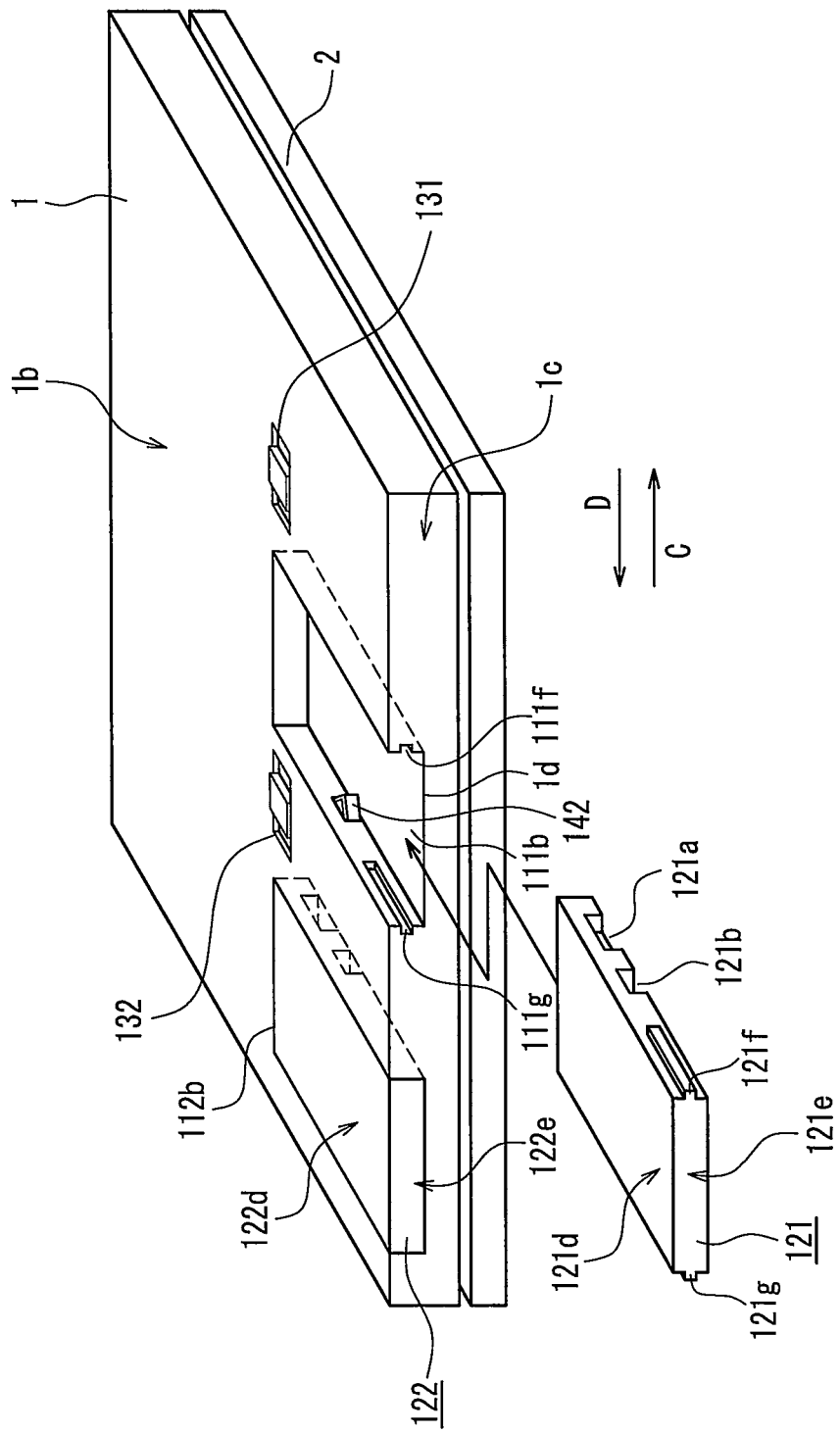
FIG. 14 is a perspective view showing another modification example of the notebook computer.

It is more preferable that the notebook computer and the battery unit have the configuration shown in FIG. 14. The battery unit 121 shown in FIG. 14 has convex ribs 121f and 121g that are positioned between the concave portions 121a, 121b, 121c and the lower face 121d and that are parallel to the lower face 121d. The slot 111b has concave grooves 111f and 111g in inner faces so as to be opposed to the convex ribs 121f and 121g, respectively. The convex rib 121f can be fitted in the concave groove 111f. The convex rib 121g can be fitted in the concave groove 111g.

By fitting the convex ribs 121f and 121g in the concave grooves 111f and 111g, respectively, the battery unit 121 is held by the slot 111b, whereby the battery unit 121 is less likely to be detached from the slot 111b. In other words, when the notebook computer is placed with the lower face 1b facing vertically downward and the slide lever 131 is displaced in the direction indicated by the arrow C so as to release the locking with respect to the battery unit 121, the battery unit 121 tends to be dropped from the slot 111b. However, since the convex ribs 121f and 121g are fitted in the concave grooves 111f and 111g, respectively, the battery unit 121 is less likely to be dropped from the slot 111b.

It also is possible to provide concave grooves in the battery unit 121 and convex ribs in the slot 111. However, taking into consideration the interference of the concave grooves with a battery housed in the battery unit 121, it is more preferable to provide the convex ribs 121f and 121g in the battery unit 121. In the case where the concave grooves are provided in the battery unit 121, the concave grooves preferably are formed at, for example, end portions of side faces of the battery unit 121 for avoiding such interference.

Note here that the battery unit 122 and the slot 112b may have the same configuration as the battery unit 121 and the slot 111b.

Figure 15:
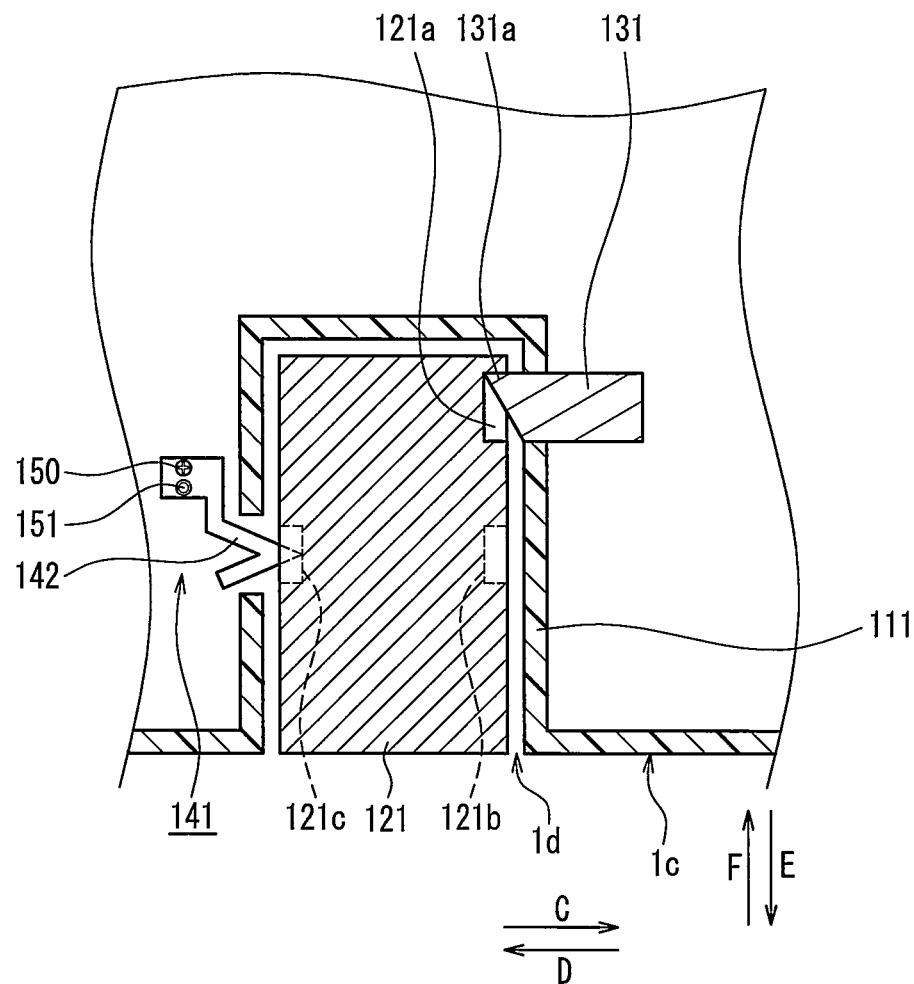
FIG. 15 is a cross-sectional view showing another modification example of the notebook computer.

Further, as shown in FIG. 15, the holding member 141 may only have the first holding portion 142. The first holding portion 142 shown in FIG. 15 is disposed between the slide lever 131 and the opening 1d in the insertion/detachment directions of the battery unit 121.

The holding member 141 in the present embodiment is one example of the battery holding portion and the battery locking means. The first holding portion 142 in the present embodiment is one example of the battery holding portion and the first holding portion. The second holding portion 143 in the present embodiment is one example of the battery holding portion and the second holding portion. The first hole 145 and the second hole 146 in the present embodiment are one example of the hole. The slide levers 131 and 132 in the present embodiment are one example of the operation portion. The slots 111 and 112 in the present embodiment are one example of the battery attachment portion. The openings 1d and 1e in the present embodiment are one example of the opening. The first housing 1 in the present embodiment is one example of the housing. The convex ribs 121f and 121g in the present embodiment are one example of the protrusion. The concave grooves 111f and 111g in the present embodiment is one example of the concave portion.

The electronic equipment disclosed in the present application is useful to equipment to/from which a battery is attachable/detachable.

The following notes are disclosed regarding the present embodiment.

(Note 1)

Electronic equipment including a first and a second battery attachment portions to/from which a battery unit is attachable/detachable, comprising:

a housing; and a holding member arranged between the first battery attachment portion and the second battery attachment portion in the housing, wherein the holding member integrally includes a first holding portion capable of locking a battery unit attached to the first battery attachment portion and a second holding portion capable of locking a battery unit attached to the second battery attachment portion.

(Note 2)

The electronic equipment according to Note 1, wherein the holding member includes a coupling portion that couples the first holding portion and the second holding portion, the coupling portion is formed with a plurality of holes, and a part of the housing engages with at least one hole among the plurality of holes.

What is claimed is:

1. An electronic equipment, comprising:
    a housing that has an opening through which an entire battery unit can pass;
    a battery attachment portion that receives the battery unit inserted through the opening, wherein the battery attachment portion includes a first battery attachment portion to which a first battery unit is attached and a second battery attachment portion to which a second battery unit is attached;
    a battery operation portion configured to be displaceable in a direction perpendicular to a direction of detachment from the battery attachment portion that locks the battery unit received in the battery attachment portion and that unlocks the battery unit by an operation of a user so as to allow the battery unit to be displaced in the direction of detachment from the battery attachment portion; and
    a battery holding portion that is arranged to engage a surface of the battery unit between the battery operation portion and the opening in the housing and that is formed as a separate member from the battery operation portion, the battery holding portion being configured to hold the battery unit such that the battery unit is prevented from being detached from the battery attachment portion unless an external force exceeding a threshold force is exerted on the battery unit when the battery unit is unlocked by the operation of the user to the battery operation portion, wherein the battery holding portion is arranged between the first battery attachment portion and the second battery attachment portion, and
    a first portion of the battery holding portion is fitted in a concave portion formed in a side face of the first battery unit on a side of the second battery attachment portion, and a second portion of the battery holding portion is fitted in a concave portion formed in a side face of the second battery unit on a side of the first battery attachment portion, thereby holding the first battery unit and the second battery unit, respectively.

2. The electronic equipment according to claim 1, wherein the battery holding portion is formed of a resilient member and configured to hold the battery unit by being fitted in a concave portion formed in one side of the battery unit.

3. The electronic equipment according to claim 1, wherein the battery operation portion is biased by a switch lever of a switch in a direction of maintaining a locked state of the battery unit, and
    when a user slides the battery operation portion to unlock the locked state, the switch lever is turned and the switch is shifted to an ON state.

4. The electronic equipment according to claim 3, further comprising:
    a light-emitting element that emits light when the switch is shifted to the ON state; and
    remaining capacity detection means that detects a remaining capacity of the battery unit,
    wherein, when detecting the shift of the switch to the ON state, the remaining capacity detection means causes the light-emitting element to emit light.

5. The electronic equipment according to claim 1, wherein the battery holding portion includes a resilient member that projects in a direction generally perpendicular to the detachment direction, and the resilient member is elastically deformable in the direction generally perpendicular to the detachment direction to hold the battery unit when the battery unit is unlocked by the operation of the user.

6. The electronic equipment according to claim 1, wherein the battery holding portion is configured to hold the battery unit such that the battery unit is prevented from being detached from the battery attachment portion when the external force exerted on the battery unit in the detachment direction is equal to or less than the weight of the battery unit.

7. An electronic equipment, comprising:
    a housing that has an opening through which an entire battery unit can pass;
    a battery attachment portion that receives the battery unit inserted through the opening, wherein the battery attachment portion includes a first battery attachment portion to which a first battery unit is attached and a second battery attachment portion to which a second battery unit is attached;

a battery operation portion arranged on a principal face of the housing, the battery operation portion configured to be displaceable in a direction perpendicular to a direction of detachment from the battery attachment portion and configured to lock the battery unit in a locked state;

a switch having a switch lever displaceable to an ON state and an OFF state;

a light-emitting element that is configured to emit light when the switch is in the ON state; and a remaining capacity detection means for detecting a remaining capacity of the battery unit, wherein the switch lever biases the battery operation portion in a direction in which the locked state of the battery unit is maintained, and when the battery operation portion is operated in a direction in which the locked state of the battery unit is displaced to an unlocked state, the switch is shifted to the ON state, wherein, when detecting the shift of the switch to the ON state, the remaining capacity detection means causes the light-emitting element to emit light based on the remaining capacity of the battery unit regardless of an ON/OFF state of the electronic equipment, and a first portion of the battery holding portion is fitted in a concave portion formed in a side face of the first battery unit on a side of the second battery attachment portion, and a second portion of the battery holding portion is fitted in a concave portion formed in a side face of the second battery unit on a side of the first battery attachment portion, thereby holding the first battery unit and the second battery unit, respectively.

8. The electronic equipment according to claim 7, further comprising:

a battery holding portion that is arranged to engage a surface of the battery unit between the battery operation portion and the opening in the housing and that is formed as a separate member from the battery operation portion, the battery holding portion being configured to hold the battery unit such that the battery unit is prevented from being detached from the battery attachment portion unless an external force exceeding a threshold force is exerted on the battery unit when the battery unit is unlocked by the operation of the user to the battery operation portion.

9. The electronic equipment according to claim 8, wherein the battery holding portion is formed of a resilient member and configured to hold the battery unit by being fitted in a concave portion formed in one side of the battery unit.

10. The electronic equipment according to claim 8, wherein the battery attachment portion includes a first battery attachment portion to which a first battery unit is attached and a second battery attachment portion to which a second battery unit is attached, the battery holding portion is arranged between the first battery attachment portion and the second battery attachment portion, and a first portion of the battery holding portion is fitted in a concave portion formed in a side face of the first battery unit on a side of the second battery attachment portion, and a second portion of the battery holding portion is fitted in a concave portion formed in a side face of the second battery unit on a side of the first battery attachment portion, thereby holding the first battery unit and the second battery unit, respectively.

11. The electronic equipment according to claim 8, wherein the battery holding portion includes a resilient member that projects in a direction generally perpendicular to the detachment direction, and the resilient member is elastically deformable in the direction generally perpendicular to the detachment direction to hold the battery unit when the battery unit is unlocked by the operation of the user.

12. The electronic equipment according to claim 8, wherein the battery holding portion is configured to hold the battery unit such that the battery unit is prevented from being detached from the battery attachment portion when the external force exerted on the battery unit in the detachment direction is equal to or less than the weight of the battery unit.

* * * * *